United States Patent
Komoriya et al.

(10) Patent No.: US 6,536,210 B1
(45) Date of Patent: Mar. 25, 2003

(54) EXHAUST GAS PURIFICATION APPARATUS FOR INTERNAL COMBUSTION ENGINE

(75) Inventors: Isao Komoriya, Saitama (JP); Ken Ogawa, Saitama (JP); Yasunori Ehara, Saitama (JP); Masanori Hayashi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/348,257

(22) Filed: Jul. 7, 1999

(30) Foreign Application Priority Data

Jul. 9, 1998 (JP) .......................................... 10-208560

(51) Int. Cl.$^7$ ................................................ F01N 3/10
(52) U.S. Cl. ......................... 60/301; 502/302; 502/525
(58) Field of Search ........................ 60/285, 286, 297, 60/301, 302, 311, 274; 502/302, 303, 525, 66, 300, 325; 423/234.1, 213.5; 556/136; 313/141

(56) References Cited

U.S. PATENT DOCUMENTS

| | | | | |
|---|---|---|---|---|
| 3,905,918 A | * | 9/1975 | Mai et al. ..................... | 502/303 |
| 4,049,583 A | * | 9/1977 | Lauder ......................... | 502/303 |
| 4,110,254 A | * | 8/1978 | Lauder ......................... | 502/303 |
| 4,849,398 A | * | 7/1989 | Takada et al. ............... | 502/303 |
| 5,066,628 A | * | 11/1991 | Miller et al. .................... | 502/66 |
| 5,347,193 A | * | 9/1994 | Oshima et al. .............. | 313/141 |
| 5,431,893 A | * | 7/1995 | Hug et al. ................ | 423/234.1 |
| 5,559,073 A | * | 9/1996 | Hu et al. ..................... | 502/302 |
| 5,611,198 A | * | 3/1997 | Lane et al. .................... | 60/301 |
| 5,727,385 A | * | 3/1998 | Hepburn ........................ | 60/297 |
| 5,801,114 A | * | 9/1998 | Durand et al. .............. | 502/302 |
| 5,990,038 A | * | 11/1999 | Suga et al. .................. | 502/303 |
| 5,997,830 A | * | 12/1999 | Itoh et al. ................. | 423/213.5 |
| 6,018,065 A | * | 1/2000 | Baum et al. ................. | 556/136 |
| 6,089,015 A | * | 7/2000 | Strehlau et al. ................ | 60/301 |
| 6,107,239 A | * | 8/2000 | Qin et al. .................... | 502/300 |
| 6,261,990 B1 | * | 7/2001 | Terada et al. ................ | 502/325 |

FOREIGN PATENT DOCUMENTS

| | | | |
|---|---|---|---|
| EP | 0577879 | * | 1/1994 |
| JP | 5-302508 | | 11/1993 |
| JP | 6-88518 | | 3/1994 |

OTHER PUBLICATIONS

Hideaka Hamada, "Recent Trends in $NO_x$ Removal Catalysts", *Journal of the National Institute of Materials and Chemical Research,* vol. 5, No. 2, pp. 39–56 (1997).

T. Duesterdiek et al., A Study of Catalytic Reduction of $NO_x$ in Diesel Exhaust, *SAE Technical Paper Series No. 862042,* pp. 11–17 (1996).

Ken Ogawa et al., "Study of a Selective Catalytic Reduction Type Lean $NO_x$ Catalyst System", *Honda R&D Technical Review,* vol. 12, No. 2, pp. 99–104 (Oct. 2000).

U.S.S.N. 09/207,600, filed: Dec. 9, 1998; By: Toshikatsu Takanohashi et al; For: Method of Purifying Exhaust Gas of Internal Combustion Engine and Apparatus Thereof.

* cited by examiner

Primary Examiner—Thomas Denion
Assistant Examiner—Tu M. Nguyen
(74) Attorney, Agent, or Firm—Arent Fox Kintner Plotkin & Kahn, PLLC

(57) ABSTRACT

An exhaust gas purification apparatus for an internal combustion engine capable of lean operation has an Ir-containing selectively reducing catalyst and an NOx adsorptive catalyst. The Ir-containing selectively reducing catalyst in which iridium is an active species thereof and NOx is selectively reduced in a lean atmosphere by HC as a reducer is disposed in an exhaust system of the internal combustion engine. The Ir-containing selectively reducing catalyst is disposed on an upstream side of the exhaust system. The NOx adsorptive catalyst adsorbs NOx in the lean atmosphere and reduce the adsorbed NOx at a theoretical air-fuel ratio or at a rich air-fuel ratio. The NOx adsorptive catalyst is disposed on a downstream side of the exhaust system.

3 Claims, 3 Drawing Sheets

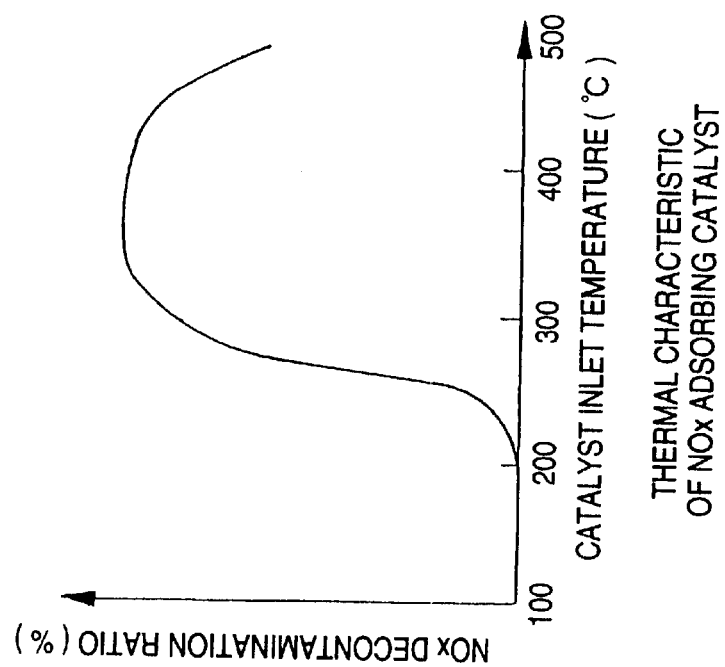
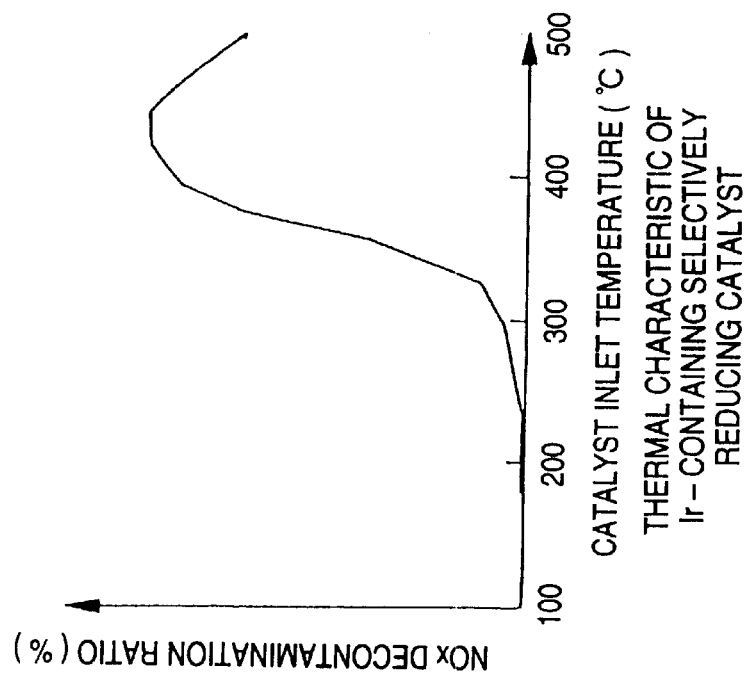

EXHAUST GAS PURIFICATION APPARATUS FOR INTERNAL COMBUSTION ENGINE

BACKGROUND OF THE INVENTION

1. Field of the Invention

The present invention relates to an exhaust gas purification apparatus for an internal combustion engine. More specifically, the present invention relates to the exhaust gas purification apparatus for an internal combustion engine wherein two different NOx purification catalysts are serially disposed in the exhaust system for improving the NOx purification efficiency and the fuel cost performance as well as for improving the durability.

2. Description of the Related Art

With progress in the leaner air-fuel ratio in recent years, such as lean burn engines and direct injection engines, it has been desired to further improve the purification performance of NOx (nitrogen oxides) in the oxidized atmosphere. For example, Unexamined Japanese Patent Publication (kokai) No. Hei 5-302508 (1993) discloses such a kind of technique.

Conventionally, a zeolite-system NOx catalysts, in which a zeolite carries a transition metal, is disposed in the exhaust system of the internal combustion engine. In addition, an NOx absorbent, which absorbs NOx when the air-fuel ratio of the in-flowing exhaust gas is lean and reduces and purifies the absorbed NOx when the oxygen concentration of the in-flowing exhaust gas decreases, is disposed on the downstream side thereof.

This conventional technique has the following structure in order to solve the inconvenience, that is, a reducer, such as HC (hydro-carbonate), needs to be replenished frequently since the NOx absorbing performance of the NOx absorbent (NOx adsorptive catalyst) saturate in a short time. A zeolite-system NOx catalysts is disposed on the upstream side so that NOx is reduced and purified by the NOx catalysts at the lean air-fuel ratio. The remaining NOx is absorbed by the NOx absorbent on a later stage to elongate the time before saturation. Further, the air-fuel ratio is periodically switched between rich or theoretical air-fuel ratio when the air-fuel ratio remains lean.

However, the adsorbing ratio of the NOx adsorptive catalyst decreases in inverse proportion to the increase in concentration of the NOx in the exhaust gas. Further, the adsorption amount has an upper limit. Accordingly, such an attempt in elongation in the saturation time as in the conventional techniques is limited. Therefore, emphasis on the fuel cost performance, in spite of degradation in the fuel cost performance due to a considerably high frequency of needs for a rich air-fuel ratio, will result with difficulty in the achievement of intended NOx purification.

A defect of the zeolite-system NOx catalyst which is used on the upstream side in the conventional technique is that the NOx purification ratio and durability under the lean air-fuel ratio, if compared with the Ir-containing (Iridium-containing) selectively reducing catalyst.

Additionally, a disadvantage of the conventional technique is that the NOx purification temperature range of the zeolite-system NOx catalysts on the upstream side does not always corresponds to that of the NOx absorbing element (NOx adsorptive catalysts) on the downstream side.

Further, the zeolite-system NOx catalyst is superior in the performance of oxidization of such as HC and CO at the theoretical air-fuel ratio in the NOx purification temperature range. Accordingly, the conventional technique has another disadvantage that it is impossible to sufficiently supply the reducer at the theoretical air-fuel ratio to the NOx absorbing element on the downstream side.

As described above, the conventional technique is unsatisfactory as for improvement in the NOx purification performance and fuel cost performance as well as durability, retaining a number of problems, such as selection of catalysts to be combined with.

SUMMARY OF THE INVENTION

Therefore, it is an object of the present invention to solve the above-described disadvantages and to provide an exhaust gas purification apparatus wherein the NOx purification performance and fuel cost performance as well as durability are improved through an optimum combination of two different catalysts at the internal combustion engine which is capable of lean operation.

According to the present invention, an exhaust gas purification apparatus for an internal combustion engine capable of lean operation comprises an Ir-containing selectively reducing catalyst and an NOx adsorptive catalyst. In the Ir-containing selectively reducing catalyst, iridium is an active species thereof and NOx is selectively reduced in a lean atmosphere by HC as a reducer is disposed in an exhaust system of said internal combustion engine. The Ir-containing selectively reducing catalyst is disposed on an upstream side of the exhaust system. The NOx adsorptive catalyst adsorbs NOx in the lean atmosphere and reduce the adsorbed NOx at a theoretical air-fuel ratio or at a rich air-fuel ratio. The NOx adsorptive catalyst is disposed on a downstream side of the exhaust system.

BRIEF DESCRIPTION OF THE DRAWINGS

In the accompanying drawings:

FIGS. 2A and 2B are graphs illustrating characteristics of NOx purification ratios of the first catalyst (Ir-containing selectively reducing catalyst) and the second catalyst (NOx adsorptive catalyst) in FIG. 1 in relationship to the catalyst temperatures;

DETAILED DESCRIPTION OF THE INVENTION

Figure 1:
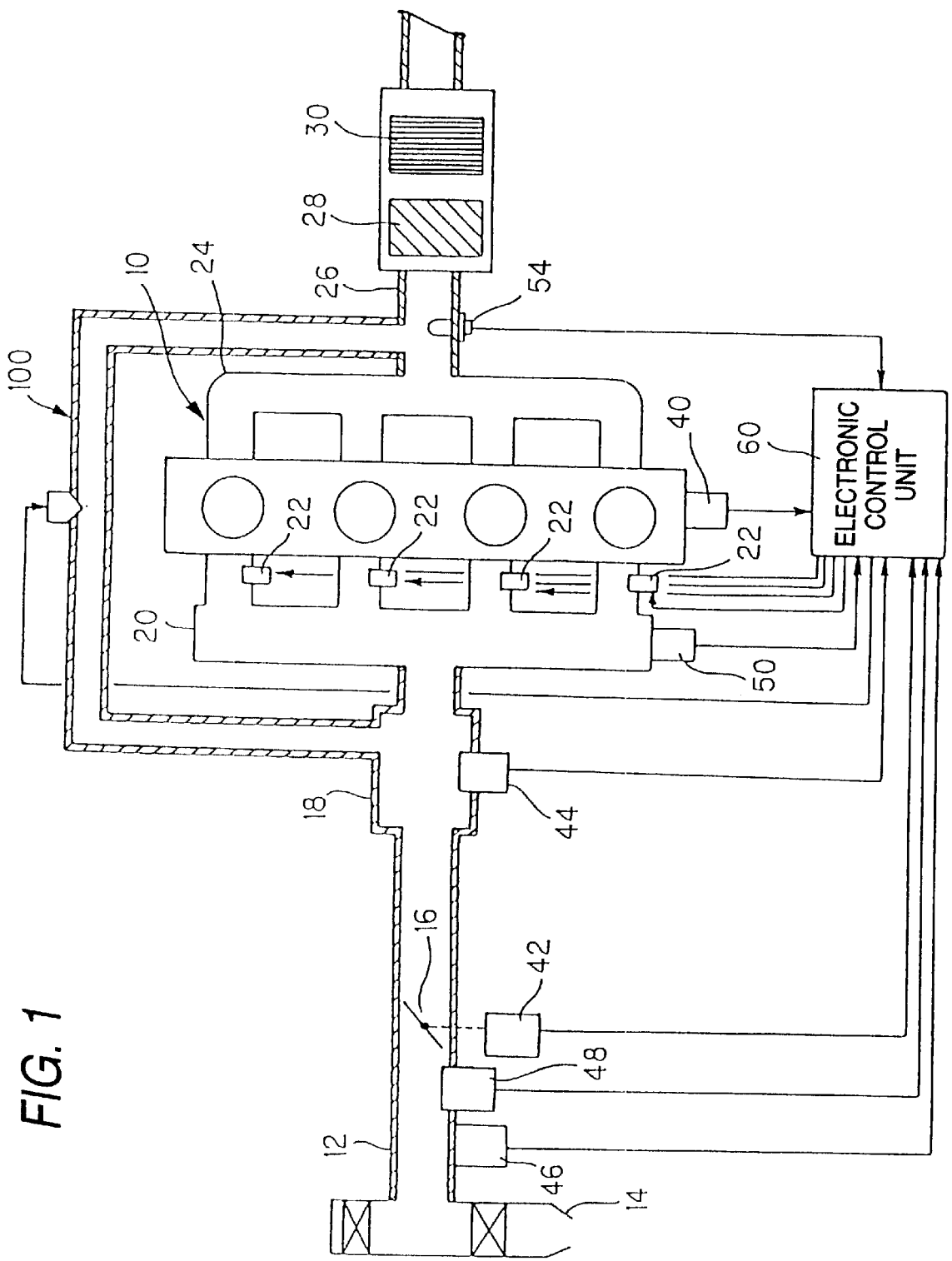
FIG. 1 is a schematic view showing an exhaust gas purification apparatus for an internal combustion engine according to the present invention.

Detailed description of the present invention will be described as follows.

In the present invention, an exhaust gas purification apparatus for the internal combustion engine capable of lean operation is provided with a Ir-containing selectively reducing catalyst and an NOx adsorptive catalyst disposed on a downstream side. In the Ir-containing selectively reducing catalyst, iridium is an active species and NOx is selectively reduced in a lean atmosphere by HC as a reducer. In the NOx adsorptive catalyst, NOx is adsorbed in the lean atmosphere and the NOx that has been adsorbed at a theoretical air-fuel ratio or at a rich air-fuel ratio under this is reduced. The NOx adsorptive catalysts on the downstream side may be added with a function to reduce selectively the NOx (reducing purification) at the lean air-fuel ratio.

The Ir-containing selectively reducing catalyst and the NOx adsorptive catalyst have different NOx purification functions and characteristics. Therefore, the best purification ratio is available. That is, the Ir-containing selectively reducing catalyst on the upstream side purifies NOx through the reaction of the NOx with the multiply bonded HC at the lean air-fuel ratio (oxidizing atmosphere). Simultaneously, the NOx adsorptive catalyst on the downstream side purifies the NOx through the adoption (or occlusion) of the NOx at the lean air-fuel ratio (oxidizing atmosphere) and the reduction with the reducer at the theoretical air-fuel ratio or the rich air-fuel ratio.

Thus, the combination of the two catalysts which have different purification functions and characteristics enables enhancement of the purification ratio to a maximum.

Additionally, the purification performances (purification ratios) of both the Ir-containing selectively reducing catalyst and the NOx adsorptive catalyst reach the highest points when the catalyst temperatures are around 400° C. Accordingly, it is also possible to enhance the NOx purification ratio by obtaining the temperature of the catalyst, and supplying the lean air-fuel ratio when the catalyst temperatures are around this degree or controlling the catalyst temperatures to the values around 400° C.

Ir-containing selectively reducing catalyst does not almost depend on the space velocity (flow system reaction, especially a proportion F/V of the raw material supply volume velocity F to the reaction vessel volume V at a gaseous phase reaction; the unit is 1/hour). The heat capacity can be reduced through reduction of the catalyst capacity, which is advantageous at such an occasion as starting of the engine at low temperatures. Additionally, this enables to shorten the activation time of the NOx adsorptive catalyst on the downstream side and reduce the load thereon.

Moreover, the NOx concentration is reduced to purify the NOx by the Ir-containing selectively reducing catalyst on the upstream side. It is possible to elongate the time before the NOx adsorptive catalyst on the downstream side reaches the saturation point. Accordingly, the operation time at the theoretical air-fuel ratio or the rich fuel ratio can be reduced. Therefore, the NOx purification performance and the fuel cost performance can be improved.

Furthermore, since the NOx adsorptive catalyst itself on the downstream side is excellent in the NOx purification performance (adsorbing performance) at the lean air-fuel ratio, a serial arrangement of the Ir-containing selectively reducing catalyst and the NOx adsorptive catalyst can enhance the NOx purification performance at the lean air-fuel ratio.

Additionally, the HC purification performance of the Ir-containing selectively reducing catalyst is lower than that of a three-way catalyst and the like in the NOx purification temperature range. Accordingly, reducing components (such as HC), which are necessary for the NOx adsorptive catalyst on the downstream side to reduce the NOx that has been adsorbed at the theoretical air-fuel ratio or at the rich air-fuel ratio, are purified but can be supplied to the NOx adsorptive catalyst. Thus, the NOx reducing purification performance of the NOx adsorptive catalyst can be enhanced.

The Ir-containing selectively reducing catalyst is used to enhance the durability in comparison with the conventional technique.

In the present invention, the Ir-containing selectively reducing catalyst contains a perovskite-type complex oxide. Preferably, it contains La atoms or Co atoms, such as $LaCoO_3$, $LaCrO_3$, $LaMnO_3$, $LaFeO_3$ and $BaTiO_3$, or more preferably it contains $LaCoO_3$.

It is possible to improve durability of the Ir-containing selectively reducing catalysts, in addition to the above-described actions and effects. That is, the Ir-containing selectively reducing catalysts have a defect that they vaporize. However, if the vaporization is successfully restrained by compound carriage of iridium as the active species and a perovskite-type complex oxide or by coating of the iridium catalyst with a perovskite-type complex oxide, the durability can be improved further.

Additionally, while in oxygen-surfeit atmosphere, this can contribute to an oxidizing reaction that $NO+O_2 \rightarrow NO_2$ with a perovskite-type complex oxide as the main and also contribute to a reducing reaction that $NO_2+HC+O_2 \rightarrow N_2+CO_2+H_2O$ with iridium as the main and HC (hydrocarbon) as a reducer.

In this way, iridium catalyst and perovskite-type complex oxide are used together for active contribution of $NO_2$ to the iridium catalyst and also for effective reduction of $NO_2$ to $N_2$ by the iridium catalyst, and thus the NOx purification performance can be further enhanced.

With references to the accompanying drawings, an embodiment of the exhaust gas purification apparatus for an internal combustion engine according to the present invention will be described.

FIG. 1 is a view which schematically shows the exhaust gas purification apparatus according to the present invention.

In the drawing, reference numeral 10 designates an OHC serial 4-cylinder 4-cycle internal combustion engine (hereinafter referred to as an "engine"). Intake air which is led through an air cleaner 14 that is disposed at a tip of an intake pipe 12, the flow ratio of which is regulated by a throttle valve 16, flows through a surge tank 18 and an intake manifold 20 and into first through fourth cylinders via an inlet valve (not shown in the drawing).

An injector 22 for fuel injection is provided respectively in the vicinity of the inlet valve (not shown) of each cylinder. Fuel-air mixture is formed by injection is ignited by an ignition plug inside each cylinder to burn and drive a piston (not shown).

Exhaust gas after combustion is discharged into an exhaust manifold 24 via an exhaust valve (not shown). Then, through an exhaust pipe 26, it is discharged outside the engine after purification by a first catalyst 28 and a second catalyst 30 which is disposed on the downstream side thereof. These catalysts are described below.

The engine 10 is provided with an EGR mechanism (exhaust gas reflux mechanism) 100 for reflux of the exhaust gas to the intake air side.

A crank angle sensor 40 is provided on a crank shaft (or a cam shaft; not shown) of the engine 10 for output of cylinder discrimination signals at a predetermined angle of a predetermined cylinder, and also for output of TDC signals and CRK signals at a predetermined crank angle of TDC or such of each cylinder and at subdivided crank angles thereof, such at 15 degrees.

A throttle opening sensor 42 is connected to the throttle valve for output of signals corresponding to the extent of the opening while an absolute pressure sensor 44 is provided inside the intake pipe 12 on the downstream side of the throttle valve 16 for output of signals corresponding to absolute pressures PBA inside the intake pipe.

An atmospheric pressure sensor 46 is provided at an appropriate position of the engine 10 for output of signals according to the atmospheric pressures PA. An intake air temperature sensor 48 is provided at an appropriate position on the upstream side of the throttle valve 16 for output of signals according to the intake air temperatures TA. A water temperature sensor 50 is provided at an appropriate position of the engine 10 for output of signals according to the water temperatures TW.

Additionally, in the exhaust system, an air-fuel ratio sensor 54 is provided at an appropriate position on the upstream side of the first catalyst apparatus 28 on the exhaust system convergent part on the downstream side of the exhaust manifold 24 for output of signals in proportion to the oxygen concentration in the exhaust gas.

The outputs from these sensors are transmitted to an electric control unit (ECU) 60 which consists of an microcomputer, where the fuel injection amount is computed with utilization of the detected values, and then the injector 22 of each cylinder is driven according to the computed values.

Regarding to the above-mentioned catalysts now, in this embodiment, the first catalyst 28 is a Ir-containing selectively reducing catalyst in which iridium (Ir) is the active species thereof and NOx is selectively reduced in the lean atmosphere by HC as a reducer. Specifically, it consists of a catalyst that contains a perovskite-type complex oxide (such as, $LaCoO_3$). More specifically, it consists of a catalyst in which a compound of iridium as the active species and a perovskite-type complex oxide is carried or the iridium catalyst is coated with the perovskite-type complex oxide (such as, $LaCoO_3$)

The iridium catalyst has the defect that the durability is low in the hot oxygen-surfeit atmosphere whereas the NOx purification performance is high in the oxygen-surfeit atmosphere. The defect is that some of the iridium is oxidized into iridium dioxide ($IrO_2$) and then this is further oxidized into iridium trioxide ($IrO_3$) which vaporizes.

The durability is successfully enhanced through restraining of vaporization by means of compound carriage of iridium as the active species and the perovskite-type complex oxide or by means of coating of the iridium catalyst with the perovskite-type complex oxide.

Additionally, in the oxygen-surfeit atmosphere, the above-described structure enables contribution to an oxidizing reaction that $NO+O_2 \rightarrow NO_2$ with a perovskite-type complex oxide as the main and also contribute to a reducing reaction that $NO_2+HC+O_2 \rightarrow N_2+CO_2+H_2O$ with iridium as the main and HC (hydrocarbon) as a reducer.

In this way, iridium catalyst and perovskite-type complex oxide are used together for active contribution of $NO_2$ to the iridium catalyst and also for effective reduction of $NO_2$ to $N_2$ by the iridium catalyst, and thus the NOx purification performance can be enhanced further.

As the perovskite-type complex oxide, $LaCoO_3$, $LaCrO_3$, $LaMnO_3$, $LaFeO_3$, $BaTiO_3$ and the like, which contains La atoms or Co atoms, are preferably used. $LaCoO_3$ is more preferable. Powder of the complex oxide and silica may be baked so as to coat the iridium catalyst in strata or it may be carried in compound with iridium.

The above-described Ir-containing selectively reducing catalyst 28 purifies the NOx through the adoption (or occlusion) of the NOx at the rich air-fuel ratio (oxidizing atmosphere) and the reduction with the reducer at the theoretical air-fuel ratio or the rich air-fuel ratio.

The NOx purification ratio at that time increases in proportion to the increase in the ratio of HC concentration to the NOx concentration, more specifically, the ratio of concentration of the olefin-system HC (or aroma-system HC) which contains multiple bonds, such as double bonds and triple bonds, to concentration of the NOx. The NOx purification ratio, however, saturates at a point.

Therefore, an optimum setting of the ratio enables enhancement of the NOx purification ratio to a maximum. Since this has been described in U.S. patent application Ser. No. 09/133,315, detailed descriptions are eliminated here.

The second catalyst 30 in this embodiment consists of the NOx adsorptive catalyst which adsorbs NOx in the lean atmosphere and which reduces and purifies the NOx that has been adsorbed at a theoretical air-fuel ratio or at a rich air-fuel ratio under that.

As for the NOx adsorptive catalyst, either so-called occlusive catalyst, such as has been proposed in Unexamined Japanese Patent Publication (kokai) Hei 6-88518 (1994) or so-called adsorptive catalyst, such as has been proposed by this assignee in U.S. patent application Ser. No. 09/207,600 filed on Dec. 9, 1998 may be utilized.

Either of the occlusive catalyst and the adsorptive catalyst occludes (or adsorbs) NOx in the lean atmosphere where oxygen concentration in the exhaust gas is high with abundant NOx. On the other hand, it reduces the NOx that has been occluded (or adsorbed) with HC and CO in the rich atmosphere where oxygen concentration is comparatively low with abundant HC and CO. HC and CO are oxidized and discharged as water vapor and carbon dioxide.

The occlusive catalyst is composed of BaO (Barium oxide) and the adsorptive catalyst is composed of, for example, Na and Ti or Sr and Ti. Either of the occlusive catalyst and the adsorptive catalyst utilizes Pt or such as the catalyst element. Since Pt is utilized in common, the oxidization performance is high with favorable three-way catalyst characteristics at the theoretical air-fuel ratio in the NOx purifying temperature range.

In the exhaust gas purification apparatus according to the present invention, the Ir-containing selectively reducing catalyst 28 and the NOx adsorptive catalyst 30 are serially disposed. Advantages of this combination are now described.

Firstly, combination of the two catalysts which have different NOx purification functions or characteristics while the purification temperature ranges overlap each other enables a full utilization of the purification ratios.

That is, the Ir-containing selectively reducing catalyst 28 on the upstream side purifies NOx through the reaction of the NOx with the multiply bonded HC at the lean air-fuel ratio (oxidizing atmosphere) while the NOx adsorptive catalyst 30 on the downstream side purifies the NOx through the adoption (or occlusion) of the NOx at the lean air-fuel ratio (oxidizing atmosphere) and the reduction with the reducer at the theoretical air-fuel ratio or the rich air-fuel ratio.

Combination of the two catalysts which have different purification functions and characteristics enables a maximum utilization of the purification ratios of the both and thus enhances the purification performance.

On the other hand, in the conventional technique of Unexamined Japanese Patent Publication (kokai) No. Hei. 5-302508, a zeolite-system NOx catalysts wherein a zeolite is made to carry a transition metal, more specifically a zeolite-system NOx catalysts wherein a transition metal, such as Cu, is made to be carried by zeolite through ion exchange.

This zeolite-system NOx catalyst which selectively reduces the NOx at the lean air-fuel ratio (oxidizing atmosphere) so long as HC exists is inferior to the Ir-containing selectively reducing catalyst in the NOx purification ratio and durability at the lean air-fuel ratio.

The zeolite-system NOx catalyst is markedly inferior to such as the iridium catalyst in the durability and the purification temperature range does not always coincides with that of the NOx adsorptive catalyst which is disposed on the downstream side thereof. Therefore, if conditions are different, as in the case of the present invention, the mutually complementing effect cannot be expected.

That is, as shown in FIGS. 2A and 2B, the purification performances (purification ratios) of both the Ir-containing selectively reducing catalyst 28 and the NOx adsorptive catalyst 30 of the present invention reach the highest points when the catalyst temperatures are around 400° C.

Therefore, as proposed in U.S. patent application Ser. No. 09/133,315, after the catalyst temperatures are obtained, it is also possible to enhance the NOx purification ratio by means of supply at the lean air-fuel ratio when the catalyst temperatures are around this degree or when the catalyst temperatures are controlled to such catalyst temperatures.

In the case of Ir-containing selectively reducing catalyst 28 of the present invention, the dependence on the space velocity is extremely small. Therefore, the heat capacity can be reduced through reduction of the catalyst capacity, which is advantageous at such an occasion as starting of the engine at low temperatures. Additionally, reduced heat capacity enables to shorten the activation time of the NOx adsorptive catalyst 30 on the downstream side and to reduce the load on the NOx adsorptive catalyst 30.

On the other hand, since the dependence on the space velocity is generally high in the case of the zeolite-system NOx catalyst by the conventional technique, a large catalyst capacity is necessary for fulfillment of predetermined purification performance, and thus such effect as above cannot be expected.

Moreover, in the exhaust gas purification apparatus according to the present invention, since the selectively reducing catalyst 28 and the NOx adsorptive catalyst 30 are arranged serially, the Ir-containing selectively reducing catalyst 28 on the upstream side purifies the NOx and decreases the NOx concentration. Thus, the time before the NOx adsorptive catalyst 30 on the downstream side reaches the saturation point can be elongated.

Figure 3:
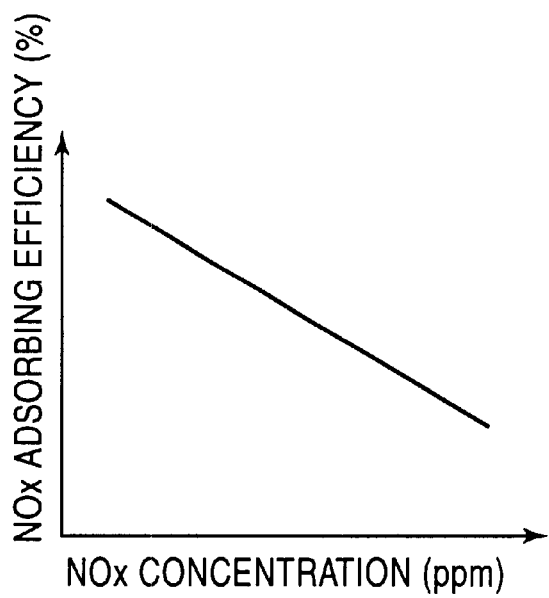
FIG. 3 is a diagrammatic chart which illustrates characteristics of NOx adsorbing efficiency of the second catalyst in FIG. 1.

FIG. 3 is a graph to illustrate the NOx adsorption ratio (%) of the catalyst 30 in respect of the NOx concentration (ppm). Further, as is clear from the graph, decrease in the concentration through purification of the NOx by the Ir-containing selectively reducing catalyst 28 on the upstream side can increase the adsorption ratio of the NOx adsorptive catalyst 30 on the downstream.

Figure 4:
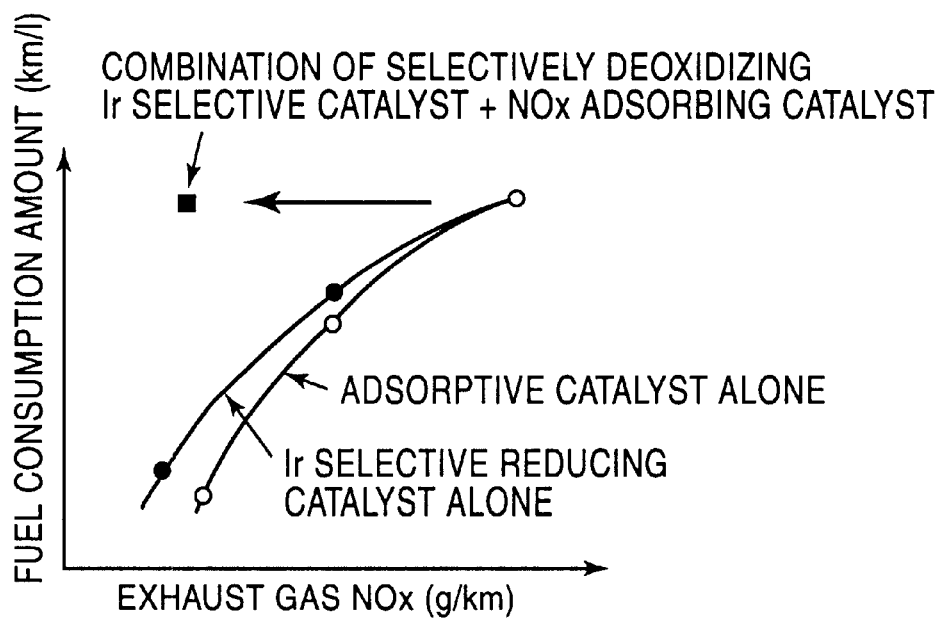
FIG. 4 is a diagrammatic chart which illustrates improvement in the fuel consumption (fuel cost performance) in a case where the first catalyst (Ir-containing selectively reducing catalyst) and the second catalyst (NOx adsorptive catalyst) in FIG. 1 are used together in comparison with a case where each of them is used alone.

Thus, the operation time at the theoretical air-fuel ratio or the rich fuel ratio can be reduced, resulting with an optimum improvement in the NOx purification performance and the fuel cost performance. As shown in FIG. 4, if compared with single uses of the Ir-containing selectively reducing catalyst 28 and the NOx adsorptive catalyst 30 on the downstream, the compound use can increase both the NOx purification performance and the fuel cost performance.

Additionally, the HC purification performance of the Ir-containing selectively reducing catalyst 28 is lower than that of three-way catalyst or the like in the NOx purification temperature range. Accordingly, reducing components (such as HC) which are necessary for the NOx adsorptive catalyst on the downstream side to reduce the NOx that has been adsorbed at the theoretical air-fuel ratio or at the rich air-fuel ratio will not be purified but supplied to the NOx adsorptive catalyst 30. Therefore, the NOx reducing purification performance of the NOx adsorptive catalyst can be enhanced.

Furthermore, since the NOx adsorptive catalyst 30 itself on the downstream side is excellent in the HC purification performance (three-way catalyst performance) at the theoretical air-fuel ratio, a serial arrangement of the Ir-containing selectively reducing catalyst 28 and the NOx adsorptive catalyst 30 can enhance not only the NOx purification performance over the air-fuel ratios from the lean to the rich but also the HC and Co purification performances.

Therefore, this can eliminate complex structures which have been adopted by the conventional technique, such as a bypass line for bypassing of zeolite-system NOx catalyst on the upstream side being provided on the exhaust system for feeding the exhaust gas to the NOx adsorptive catalyst via the bypass line at the rich operation or for filling the reducer in a tank so as to be supplied at the rich operation.

As described above, the exhaust gas purification apparatus for the internal combustion engine (engine 10) that is capable of lean operation, has the structure that the Ir-containing selectively reducing catalyst (the first catalyst 28) where iridium is an active species thereof and where NOx is selectively reduced in the lean atmosphere by HC as the reducer is disposed in the exhaust system (the exhaust pipe 26) and also that the NOx adsorptive catalyst (the second catalyst 30) where NOx is adsorbed in the lean atmosphere and where the NOx that has been adsorbed at the theoretical air-fuel ratio or at the rich air-fuel ratio under this is reduced is disposed on the downstream side thereof. The NOx adsorptive catalysts on the downstream side may be added with the function to reduce selectively the NOx (reducing purification) at the theoretical air-fuel ratio.

The Ir-containing selectively reducing catalyst contains the perovskite-type complex oxide. The complex oxide containing La atoms or Co atoms, such as $LaCoO_3$, $LaCrO_3$, $LaMnO_3$, $LaFeO_3$ or $BaTiO_3$ is preferable. $LaCoO_3$ is more preferable.

According to the present invention, since the Ir containing selectively reducing catalyst and the NOx adsorptive catalyst which have different NOx purification functions and characteristics are combined, the best purification ratio is available.

That is, the Ir-containing selectively reducing catalyst on the upstream side purifies NOx through the reaction of the NOx with the multiply bonded HC at the lean air-fuel ratio (oxidizing atmosphere). The NOx adsorptive catalyst on the downstream side purifies the NOx through the adoption (or occlusion) of the NOx at the lean air-fuel ratio (oxidizing atmosphere) and the reduction with the reducer at the theoretical air-fuel ratio or the rich air-fuel ratio. Thus, the combination of the two catalysts which have different purification functions and characteristics enables enhancement of the purification ratio to the maximum.

Additionally, the purification performances (purification ratios) of both the Ir-containing selectively reducing catalyst and the NOx adsorptive catalyst reach the highest points when the catalyst temperatures are around 400° C. It is also possible to enhance the NOx purification ratio by obtaining the catalyst temperature, and supplying the lean air-fuel ratio when the catalyst temperatures are around this degree or by controlling the catalyst temperatures to the values around 400° C.

The Ir-containing selectively reducing catalyst does not almost depend on the space velocity (flow system reaction, especially the proportion F/V of the raw material supply volume velocity F to the reaction vessel volume V at the gaseous phase reaction; the unit is 1/hour). Accordingly, the heat capacity can be reduced through reduction of the catalyst capacity, which is advantageous at such an occasion as starting of the engine at low temperatures. Additionally, this enables to shorten the activation time of the NOx adsorptive catalyst on the downstream side and reduce the load thereon.

Moreover, since decrease in the NOx concentration through purification of the NOx by the Ir-containing selectively reducing catalyst on the upstream side can elongate the time before the NOx adsorptive catalyst on the downstream side reaches the saturation point, the operation time at the theoretical air-fuel ratio or the rich fuel ratio can be reduced, resulting with an optimum improvement in the NOx purification performance and the fuel cost performance.

Furthermore, since the NOx adsorptive catalyst itself on the downstream side is excellent in the NOx purification performance (adsorbing performance) at the lean air-fuel ratio, the serial arrangement of the Ir-containing selectively reducing catalyst and the NOx adsorptive catalyst can enhance the NOx purification performance at the lean air-fuel ratio.

Additionally, the HC purification performance of the Ir-containing selectively reducing catalyst is lower than that of three-way catalyst or the like in the NOx purification temperature range. Accordingly, reducing components (such as HC) which are necessary for the NOx adsorptive catalyst on the downstream side to reduce the NOx that has been adsorbed at the theoretical air-fuel ratio or at the rich air-fuel ratio is not purified but supplied to the NOx adsorptive catalyst. Thus, the NOx reducing purification performance of the NOx adsorptive catalyst can be enhanced.

Besides the above, utilization of the Ir-containing selectively reducing catalyst can enhance the durability if compared with the conventional technique.

According to the present invention, it is possible to improve durability of the Ir-containing selectively reducing catalysts, in addition to the above-described actions and effects. That is, the Ir-containing selectively reducing catalysts have the defect that they vaporize but, if the vaporization is successfully restrained by compound carriage of iridium as the active species and the perovskite-type complex oxide or by coating of the iridium catalyst with the perovskite-type complex oxide, the durability can be improved further.

Additionally, while in oxygen-surfeit atmosphere, this can contribute to an oxidizing reaction that $NO+O_2 \rightarrow NO_2$ with the perovskite-type complex oxide as the main and also contribute to the reducing reaction that $NO_2+HC+O_2 \rightarrow N_2+CO_2+H_2O$ with iridium as the main and HC (hydrocarbon) as the reducer.

In this way, iridium catalyst and perovskite-type complex oxide are used together for active contribution of $NO_2$ to the iridium catalyst and also for effective reduction of $NO_2$ to $N_2$ by the iridium catalyst, and thus the NOx purification performance can be further enhanced.

What is claimed is:

1. An exhaust gas purification apparatus for an internal combustion engine capable of lean operation, comprising:
    a non-zeolite Ir-containing selectively reducing catalyst in which Iridium is an active species thereof and NOx is selectively reduced in a lean atmosphere by HC as a reducer is disposed in an exhaust system of said internal combustion engine, said Ir-containing selectively reducing catalyst being disposed on an upstream side of the exhaust system; and
    an NOx adsorptive catalyst which adsorbs NOx in the lean atmosphere and reduces the adsorbed NOx at a theoretical air-fuel ratio, said NOx adsorptive catalyst being disposed on a downstream side of the exhaust system;
    wherein said Ir-containing selectively reducing catalyst is coated with a top layer of perovskite-type complex oxide to prevent dispersion or vaporization of the Iridium.

2. The exhaust gas purification apparatus for the internal combustion engine according to claim 1, wherein said perovskite-type complex oxide contains La atoms or Co atoms.

3. The exhaust gas purification apparatus for the internal combustion engine according to claim 2, wherein said perovskite-type complex oxide is one of $LaCoO_3$, $LaCrO_3$, $LaMnO_3$, $LaFeO_3$ and $BaTiO_3$.

* * * * *